Jan. 4, 1944.  E. N. DINGLEY, JR  2,338,100
BLIND LANDING EQUIPMENT
Filed June 25, 1940   2 Sheets-Sheet 2
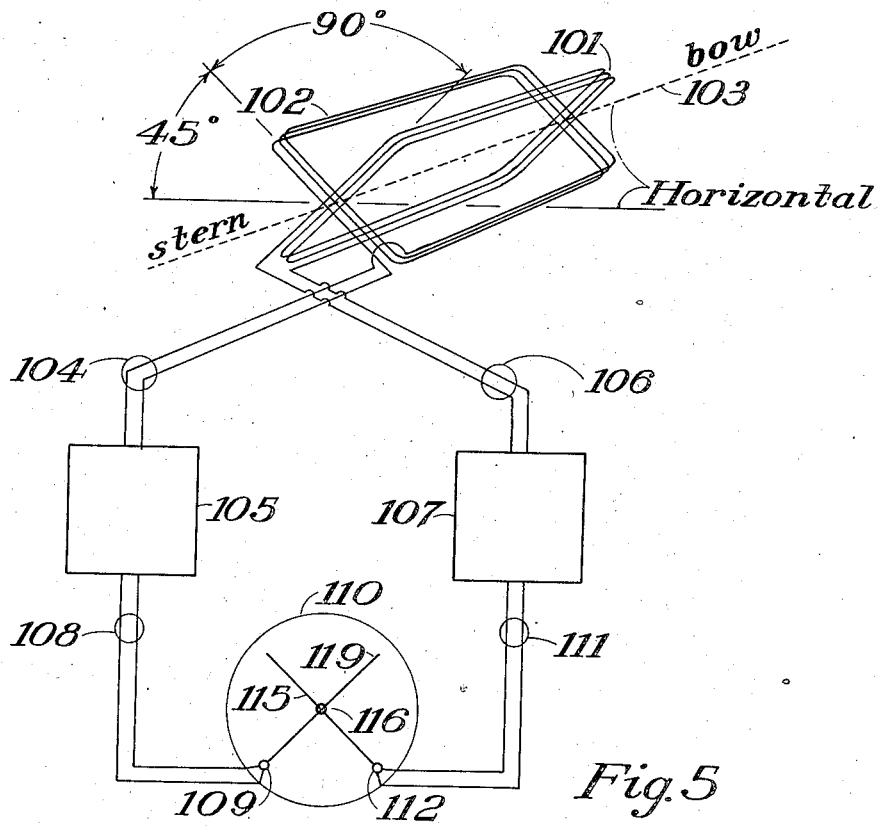
Fig. 5
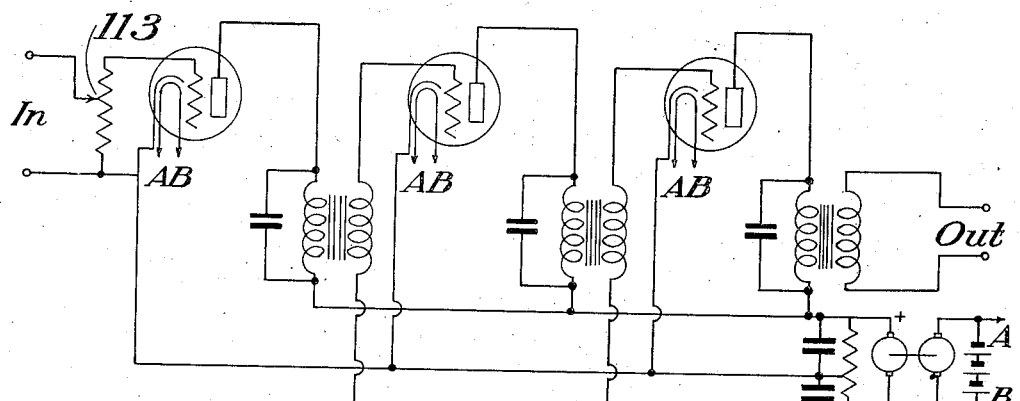
Fig. 6    105 or 107
INVENTOR
BY E. N. DINGLEY Jr.
ATTORNEY Patented Jan. 4, 1944

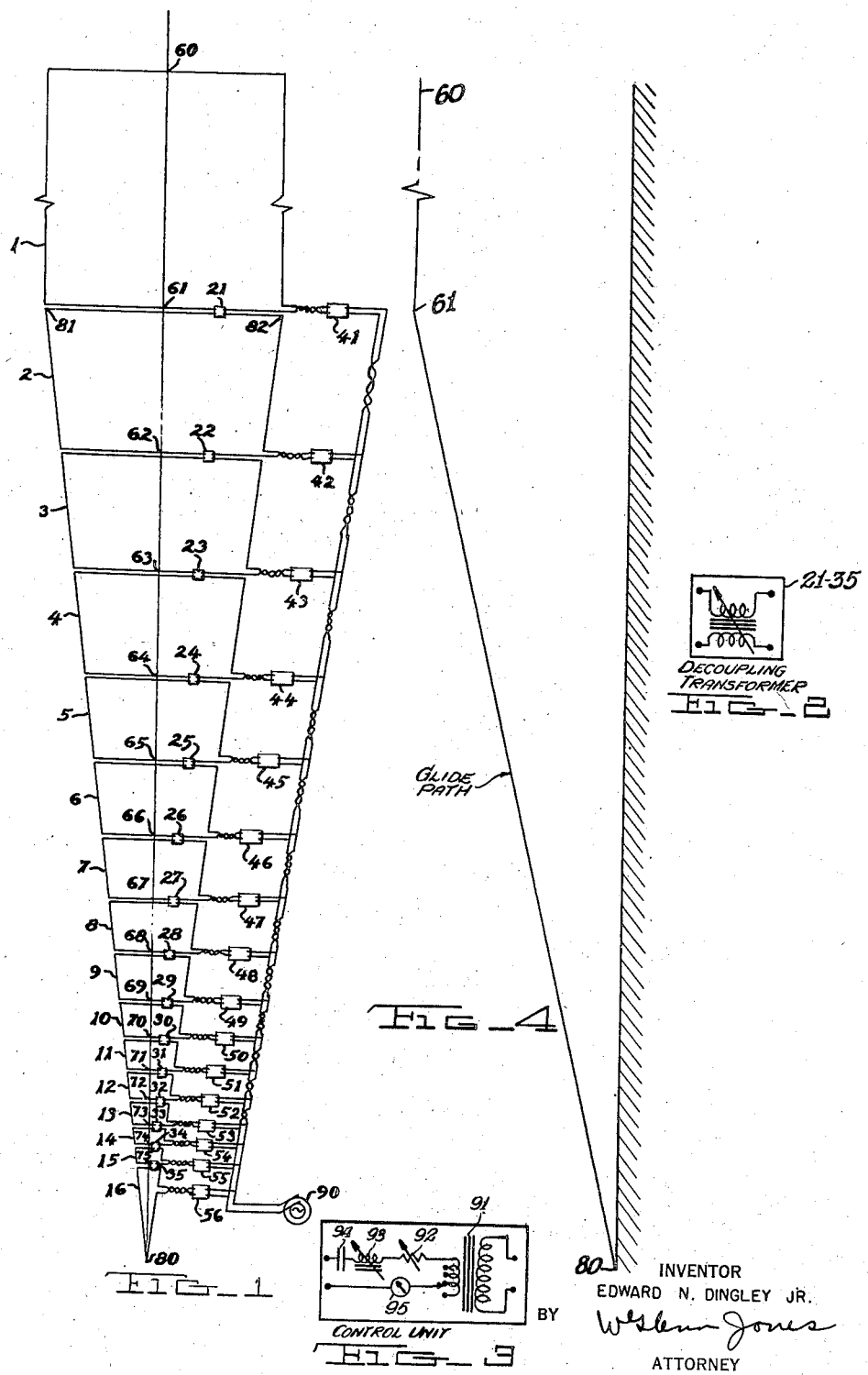

2,338,100

UNITED STATES PATENT OFFICE 2,338,100

BLIND LANDING EQUIPMENT

Edward N. Dingley, Jr., Arlington, Va.

Application June 25, 1940, Serial No. 342,311

11 Claims. (Cl. 177—352)

(Granted under the act of March 3, 1883, as amended April 30, 1928; 370 O. G. 757)

My invention relates to an improved means for producing in space an electromagnetic field of which the locus of all points of constant field strength is a line in space of any desired curvature and having any desired relation with the surface of the earth.

One of the objects of my invention is to provide an improved means for setting up a magnetic field that may be used to guide an aircraft in landing, as described in my application Serial No. 191,735, filed February 21, 1938, for producing an electromagnetic glide path in space.

Other and further objects of my invention will be understood from the following specification and by reference to the accompanying drawings, of which:

Fig. 1 is a plan view showing the arrangement and connection of the ground wires.

Fig. 2 is an internal wiring diagram of the decoupling transformers 21 through 35 of Fig. 1.

Fig. 3 is an internal wiring diagram of the control units 41 through 56 of Fig. 1.

Fig. 4 is a side elevation of the glide path in space.

Figure 5 is a diagram of a receiving means and Figure 6 is a diagram of an amplifier used in the receiving means.

In Figs. 1 and 4, the point 80 represents the desired landing point for an aircraft and the line 60—80 represents the desired line of approach or glide path which the airplane should follow in order to land at point 80. It is desirable that the glide path, which is a locus of points of substantially constant field strength, should be parallel to the surface of the earth, at a specified altitude, between the points 60 and 61 and that it should be inclined downward toward the earth at an angle of approximately 3.5 degrees between the points 61 and 80.

In order to accomplish this objective, the insulated wire 1 is laid on, above, or buried beneath the surface of the earth in the form of a rectangle having two opposite sides parallel to the glide path 60—80 and having its two other sides passing through the projection, on the plane of the rectangle, of points 60 and 61. It is preferred but not mandatory that the sides of the wire rectangle 1, which are parallel to the glide path, should be spaced apart by a distance equal to twice the desired altitude of the glide path between the points 60 and 61.

The insulated wire 2 is laid on, above, or buried beneath the surface of the earth in the form of an isosceles trapezoid of which the two parallel bases are normal to the glide path. The longer base of the trapezoid passes through the projection, on the plane of the trapezoid, of the point 61 and has a length approximately equal to twice the desired height of the glide path at this point and the other base passes through the projection, on the plane of the trapezoid, of the point 62 and has a length approximately equal to twice the desired height of the glide path at this point. The point 62 has an altitude approximately equal to 80 per cent of the altitude of point 61.

The insulated wires 3 through 15 form similar isosceles trapezoids of which the longer bases are equal in length and parallel and adjacent to the shorter bases of the adjacent next larger isosceles trapezoid and of which the shorter bases pass respectively through the projections on the plane of the trapezoids of the points 63 through 75. The points 63 through 75 represent points on the glide path such that each successive point in numerical order has an altitude of approximately 80 per cent of the altitude of the preceding point.

The insulated wire 16 forms an isosceles triangle of which the base is equal in length and parallel and adjacent to the shorter base of isosceles trapezoid 15.

As shown in Figure 1, the non-parallel sides of the isosceles trapezoids 2 through 15 and of the triangle 16 form the sides of a large isosceles triangle 80—81—82 having its apex at the landing point. If the glide path is taken to be curved in the vertical plane, then the sides of the large isosceles triangle 80—81—82 will assume a similar curvature in the horizontal plane.

As shown in Figure 1, the ground circuits 1 through 16 are respectively energized through the control units 41 through 56 from the common alternator 90.

Figure 3 is an enlarged view of the control units 41 through 56 wherein there is shown the tapped power transformer 91, the current adjusting variable rheostat 92, the phase correcting reactor 93 and capacitor 94 and the current measuring instrument 95.

The ground circuits 1 through 16 contain inductive reactance (as a result of their self-inductance) and the power-factor of each is different from that of others because of their differing areas and lengths. It is preferable that the currents in the circuits 1 through 16 should be in phase with each other and for reasons of economy it is desirable, but not mandatory, that the current in each circuit should be in phase with the voltage generated by the alternator 90.

To accomplish this result, each control unit 41 through 56 contains, as shown in Fig. 3, a capacitor 94 in series with the ground wire circuit. Because of the difficulty involved in obtaining capacitors having capacitive reactances exactly equal to the inductive reactance of each ground wire circuit, it is preferable to use a commercial standard power factor correcting capacitor having any standard value of capacitive reactance larger than is required to produce unity power factor current flow and to connect in series with this a variable inductive reactor 93 with which to add inductive reactance until the unity power-factor condition is achieved. The variable reactor 93 is inexpensive and is made continuously variable by means of an adjustable airgap in its laminated iron core. The design of such reactors is well known to those familiar with the art.

Having adjusted the circuit for unity powerfactor, the desired magnitude of current flow in each circuit is obtained by selecting the proper tap on the secondary of transformer 91 and by adjusting the rheostat 92.

The magnitude of the current flowing in each ground circuit is measured by means of the current measuring instrument 95 and is adjusted to give the selected field strength along the glide path.

As shown in Figure 1, ground circuit 1 has one of its sides closely adjacent to ground circuit 2 but none of its sides are closely adjacent to any of the other ground circuits. As a result of this condition, current flowing in circuit 1 will induce considerable voltage into circuit 2 through the action of mutual inductance but it will induce only negligible voltages in the other ground circuits. Because of the mutual inductance between circuits 1 and 2, any adjustment which may be made in the value of the current flow in circuit 1 will result in an undesirable change in the current flowing in circuit 2. This condition does not render the system inoperative but does make the initial adjustment more difficult. To overcome this condition, the decoupling transformer 21 is connected between circuits 1 and 2 and similarly, decoupling transformers 22 through 35 are connected between the remaining ground circuits 2 through 16, as shown in Fig. 1, in order to neutralize the effect of mutual inductance between each two adjacent circuits.

Figure 2 is an enlarged circuit diagram of the decoupling transformers 21 through 35. Each decoupling transformer consists of a 1 to 1 turnratio, two winding, laminated iron-core transformer with an adjustable airgap so located as to vary the inductance of each winding while simultaneously varying, in the same sign, the mutual coupling between windings. The design of such variable transformers is well known to those familiar with the art but their use for decoupling two coupled circuits is believed to be new and novel. At the time of installing the ground system, these decoupling transformers are adjusted as follows and never again require adjustment: the decoupling transformers 21 through 35 are all adjusted to their minimum value of mutual inductance; ground circuits 2 through 16 are open circuited; any value of current, regardless of phase, is passed through ground circuit 1; the resulting voltage induced in circuit 2 is measured; the mutual inductance of the decoupling transformer 21 is increased until the measured voltage induced in circuit 2 is reduced to zero. Next all ground circuits except circuit 2 are open circuited and any value of current, regardless of phase, is passed through circuit 2; the resulting voltage induced in circuit 3 is measured; the mutual inductance of the decoupling transformer 22 is increased until the measured voltage induced in circuit 3 is reduced to zero. The decoupling transformers 23 through 35 are adjusted in a similar manner.

The decoupling transformers 21 through 35 should be adjusted in the manner described prior to adjusting the control units 41 through 56 because the adjustment of the decoupling transformers will affect the tuning of the control units but the adjustment of the control units will not affect the adjustment of the decoupling transformers once they have been properly adjusted. The adjustment of the control units was described first in the foregoing only for the sake of clarity.

It is obvious that the decoupling transformers 21 through 35 may be physically located, if desired, within the housings containing the control units 41 through 56 respectively.

It is further obvious that some or all of the decoupling transformers 21 through 35 and some or all of the control units 41 through 56 may be physically located, if desired, on a centrally located control panel rather than in the field as indicated in Fig. 1.

Fig. 1 indicates the use of 16 separate ground circuits. It is obvious that as many ground circuits as may be needed, to cover the full length of the desired glide path, may be used. Experience has indicated that if one isosceles trapezoid ground circuit is provided for each progressive 20 per cent drop in the altitude of the glide path between the respective pairs of points 61—62, 62—63, etc., the magnetic flux surrounding the various circuits will merge into a smooth glide path of constant field strength without perceptible discontinuities.

The magnitude of current which should be caused to flow in each ground circuit is determined by the altitude of the glide path at the center, as measured along the line 60—80, of the polygon formed by each ground circuit. Experience has indicated that a current magnitude of 15 amperes per 1000 feet of altitude at 500 cycles will provide a magnetic field sufficiently large to render negligible the effects of the extraneous alternating magnetic fields generated within the airplane without requiring the use of more than ordinarily selective tuned circuits in the 500-cycle amplifier carried by the airplane.

Operation of systems using the design factors herein described has shown that the resultant magnetic field produced by currents flowing in opposite directions through each adjacent pair of wires forming the parallel sides of the trapezoids is negligibly small in comparison to the magnetic field produced by the currents flowing in the non-parallel sides of these trapezoids.

The system as described may use any desired alternation frequency; however, a frequency of 500 cycles per second has proved to be entirely satisfactory.

In order to utilize the magnetic field established by the above-described ground system, as a glide path for guiding an aircraft in landing, the aircraft is equipped with the apparatus shown in Figure 5 wherein, the multi-turn loops 101 and 102 are mounted co-axially within the fuselage of the aircraft (preferably in the tail) in such a manner that the angle between the planes of the two loops is substantially 90° and so that the angle between the horizontal and the plane of either loop is substantially 45° and so that the common axis 103 of the loops lies horizontally in the plane of the vertical center-line of the aircraft. Each collector loop consists preferably of approximately 1000 turns of No. 26 AWG silk insulated copper wire formed into an approximate square having the approximate dimensions 12 by 12 inches.

With further reference to Figure 5, the loop 102 is connected by means of the twin conductor cable 104 to the input terminals of the tuned 500-cycle amplifier 105 and loop 101 is connected by means of the like cable 106 to the tuned 500-cycle amplifier 107. In practice the amplifiers 105 and 107 are mounted in a single shock-proof mounted cabinet having dimensions approximately 6 by 10 by 8 inches.

The amplifiers 105 and 107 are of any conventional circuit design such as the one shown in Figure 6.

The 500-cycle output of amplifier 105 is connected by means of the twin conductor cable 108 to the input terminals of the port-side moving element 109 of the cross-pointer instrument 110, and the 500-cycle output of amplifier 107 is likewise connected by cable 111 to the input terminals of the starboard side moving element 112 of the cross-pointer instrument 110. Each moving element of the instrument 110 consists of a conventional A. C. voltmeter preferably of the dry-rectifier type.

In order to adjust the amplifiers for proper operation, the aircraft so equipped is placed on the centerline of the runway facing in a landing direction and at a distance from the point 80 such that the desired glide path intersects the center of the collector loops on the aircraft. The gain control 113, Figure 6, of each amplifier is adjusted until the pointers 119 and 115 of the cross-pointer instrument 110, intersect over a bull's-eye 116 in the center of the scale-plate. Each of the pointers 119 and 115 is normally vertical in the absence of applied voltage.

The energy deflecting the pointers under the foregoing condition is derived from voltages induced in coils 101 and 102 by the magnetic field of the ground cables and has a value equal to the value originally chosen to exist throughout the glide path. In consequence, whenever the aircraft is flying along the glide path and its position exactly coincides with the glide path, the cross-pointers of instrument 110 will intersect over the bull's-eye 116. If the aircraft is directly below the glide path, each collector loop 101 and 102 will receive equal but excessive induced voltage because of their nearer proximity to the ground cables and the two pointers will intersect at a point below the bull's-eye. In a like manner if the aircraft is above or to the right or left of the glide path, the point of intersection of the two pointers will be above or to the right or left of the bull's-eye as the case may be. It is of interest to note that the deflection of the point of intersection of the pointers is directly proportional to the percentage deviation of the aircraft from the glide path, that is, if the aircraft is 50 percent too low or half-way between the glide path and the ground, the point of intersection of the pointers will be 50 percent low, that is, half-way between the bull's-eye and a line connecting the pivots of the two movements. This feature permits the aircraft to maneuver over large distances, say 10 percent or 100 feet from the glide path at a glide path height of 1000 feet but this same 10 percent limits the maneuvering to 10 feet at a glide path height of 100 feet.

An alternative and preferable way of calibrating the instruments carried by the aircraft, consists of burying two insulated single conductor wires parallel to each other, one on each side of a taxiing runway. Each wire should be approximately 100 feet long. One pair of adjacent ends of these wires should be connected together and the other pair of adjacent ends should be connected to a source of alternating current (500 cycle) power through a rheostat and an ammeter. The above-described installation forms a horizontal loop of wire through which may be passed a calibrating current of the correct magnitude for any aircraft having collector loops mounted with their common axis at any known height from the plane of the aforesaid loop. Based on a current magnitude of 15 amperes per 1000 feet of altitude, the calibration current required in this calibrating loop is:

$$I = \frac{0.015(X^2 + Y^2)}{2Y}$$

Where $X$=height in feet of center of aircraft collector loops above plane of the ground cables, and $Y$=distance in feet from center of runway to each ground cable.

The use of such a calibrating loop obviates the necessity of using the glide path runway for calibrating purposes and additionally provides a horizontal calibrating glide path over a distance of approximately 75 feet which may be used each time an aircraft taxies to or from the hangar.

Most airports are equipped with a radio runway localizer or low power radio beacon having its legs or courses directed along the main runways. Experience has shown that such radio runway localizers are of great assistance in guiding the aircraft from a distance of 15 or 20 miles from the airport to the entrance of the 500-cycle glide path. In practice, it has been found that a pilot who follows such a radio runway localizer at an altitude of 1000 feet, as determined by the barometric altimeter, will reach the 500-cycle glide path within 100 feet or 10 percent from the center of the glide path.

Experience has indicated that the use of lead or metal outer sheathing on the insulated ground wires is undesirable because of the power lost as the result of circulating currents flowing in the metallic sheath. It is preferable to use wires insulated with a layer of non-hygroscopic rubber, such as "Aquanol," over which there is placed an outer protective layer of tellurium rubber compound.

The invention herein described and claimed may be used and/or manufactured by or for the Government of the United States of America for governmental purposes without the payment of any royalties thereon or therefor.

I claim:

1. Apparatus for setting up magnetic fields to define a landing path for aircraft, comprising a loop circuit substantially rectangular in form whereof two sides are normal to the projection on the earth of the desired path, a series of loop circuits each substantially isosceles trapezoidal in outline disposed with their parallel bases normal to said projection, the longer base of the first said trapezoidal loop being adjacent and parallel to one side of said rectangular loop and each succeeding loop having its longer base parallel and adjacent to the shorter base of the preceding loop and of substantially the same length as said preceding shorter base, a final loop circuit substantially isosceles triangular in outline with its base adjacent and parallel to the shorter base of the preceding trapezoidal loop and equal in length thereto; a common source of alternating current supply, individual means connecting each said loop circuit to said common supply including means to control the magnitude of the current in each said loop to a value progressively less than in the preceding loop whereby the magnetic fields due to currents in the sides of the loops define a locus of points of constant field strength decreasing in altitude at a predetermined rate of descent for an aircraft toward the apex of said triangular loop, and a decoupling transformer between each loop circuit and the loops juxtaposed thereto to neutralize the mutual inductive effect of said loops upon each other.

2. Apparatus for setting up magnetic fields to define a landing path for aircraft, comprising a loop circuit substantially rectangular in form whereof two sides are normal to the projection on the earth of the desired path, a series of loop circuits each substantially isosceles trapezoidal in outline disposed with their parallel bases normal to said projection, the longer base of the first said trapezoidal loop being adjacent and parallel to one side of said rectangular loop and each succeeding loop having its longer base parallel and adjacent to the shorter base of the preceding loop, a final loop circuit substantially isosceles triangular in outline with its base adjacent and parallel to the shorter base of the preceding trapezoidal loop; a common source of alternating current supply, individual means connecting each said loop circuit to said common supply including means to control the magnitude of the current in each said loop to a value progressively less than in the preceding loop whereby the magnetic fields due to currents in the sides of the loops define a locus of points of constant field strength decreasing in altitude at a predetermined rate of descent for an aircraft toward the apex of said triangular loop, and means to neutralize the mutual inductive effect of said loops upon each other.

3. Apparatus for setting up magnetic fields to define a landing path for aircraft, comprising a loop circuit substantially rectangular in form whereof two sides are normal to the projection on the earth of the desired path, a series of loop circuits each substantially isosceles trapezoidal in outline disposed with their parallel bases normal to said projection, the longer base of the first said trapezoidal loop being adjacent and parallel to one side of said rectangular loop and each succeeding loop having its longer base parallel and adjacent to the shorter base of the preceding loop, a final loop circuit substantially isosceles triangular in outline with its base adjacent and parallel to the shorter base of the preceding trapezoidal loop; a common source of alternating current supply, individual means connecting each said loop circuit to said common supply including means to control the magnitude of the current in each said loop to a value progressively less than in the preceding loop whereby the magnetic fields due to currents in the sides of the loops define a locus of points of constant field strength decreasing in altitude at a predetermined rate of descent for an aircraft toward the apex of said triangular loop, and means to neutralize the mutual inductive effect of said loops upon each other.

4. Apparatus for setting up magnetic fields to define a landing path for aircraft, comprising a loop circuit substantially rectangular in form whereof two sides are normal to the projection on the earth of the desired path, a series of loop circuits each substantially isosceles trapezoidal in outline disposed with their parallel bases normal to said projection, the longer base of the first said trapezoidal loop being adjacent and parallel to one side of said rectangular loop and each succeeding loop having its longer base parallel and adjacent to the shorter base of the preceding loop, a final loop circuit substantially isosceles triangular in outline with is base adjacent and parallel to the shorter base of the preceding trapezoidal loop; a common source of alternating current supply, and individual means connecting each said loop circuit to said common supply including means to control the magnitude of the current in each said loop to a value progressively less than in the preceding loop whereby the magnetic fields due to currents in the sides of the loops define a locus of points of constant field strength decreasing in altitude at a predetermined rate of descent for an aircraft toward the apex of said triangular loop.

5. Apparatus for setting up magnetic fields to define a landing path for aircraft, comprising a series of loop circuits each substantially isosceles trapezoidal in outline disposed with their bases normal to the projection on the earth of the desired path and with the shorter base of each adjacent to and of the same length as the longer base of the next succeeding circuit, a final circuit substantially isosceles triangular in outline, the the lengths of said bases being such that the sides of all said circuits define the sides of a substantially isosceles triangle symmetrically disposed with respect to said path, means to supply to each said circuit an alternating current, the magnitudes of the currents in said circuits decreasing toward the said apex of said triangle whereby the magnetic fields due to the currents in the sides of said circuits define a line of constant predetermined field strength disposed to constitute a suitable landing path for an aircraft, and means to neutralize the mutual inductive effect of said circuits upon each other.

6. Apparatus for setting up magnetic fields to define a landing path for aircraft, comprising a series of loop circuits each substantially isosceles trapezoidal in outline disposed with their bases normal to the projection on the earth of the desired path and with the shorter base of each adjacent to and of the same length as the longer base of the next succeeding circuit, a final circuit substantially isosceles triangular in outline, the lengths of said bases being such that the sides of all said circuits define the sides of a substantially isosceles triangle symmetrically disposed with respect to said path, means to supply to each said circuit an alternating current, the magnitudes of the currents in said circuits decreasing toward the said apex of said triangle whereby the magnetic fields due to the currents in the sides of said circuits define a line of constant predetermined field strength disposed to constitute a suitable landing path for an aircraft, and means to neutralize the mutual inductive effect of said circuits upon each other.

7. Apparatus for setting up magnetic fields to define a landing path for aircraft, comprising a series of loop circuits each substantially isosceles trapezoidal in outline disposed with their bases normal to the projection on the earth of the desired path and with the shorter base of each adjacent to and of the same length as the longer base of the next succeeding circuit, a final circuit substantially isosceles triangular in outline, the lengths of said bases being such that the sides of all said circuits define the sides of a substantially isosceles triangle symmetrically disposed with respect to said path, and means to supply to each said circuit an alternating current, the magnitudes of the currents in said circuits decreasing toward the said apex of said triangle whereby the magnetic fields due to the currents in the sides of said circuits define a line of constant predetermined field strength disposed to constitute a suitable landing path for an aircraft.

8. Apparatus for setting up magnetic fields to define a landing path for aircraft, comprising a series of loop circuits each substantially isosceles trapezoidal in outline disposed with their bases normal to the projection on the earth of the desired path and with the shorter base of each adjacent to and of the same length as the longer base of the next succeeding circuit, a final circuit substantially isosceles triangular in outline, the lengths of said bases being such that the sides of all said circuits define the sides of a substantially isosceles triangle symmetrically disposed with respect to said path, and means to supply to each said circuit an alternating current, the magnitudes of the currents in said circuits decreasing toward the said apex of said triangle whereby the magnetic fields due to the currents in the sides of said circuits define a line of constant predetermined field strength disposed to constitute a suitable landing path for an aircraft.

9. Apparatus for setting up magnetic fields to define a landing path for aircraft, comprising a plurality of separate loop circuits disposed seriatim adjacent each other, said circuits being shaped in outline to define an isosceles triangle on a rectangular base symmetrically disposed about the projection on the earth of said path, means to supply to said circuits alternating currents of decreasing magnitude in the successive circuits in a direction away from said base whereby the locus of points of constant predetermined magnetic field strength due to the currents in the sides of said triangle define a suitable said landing path, and means to neutralize the mutual inductive effect of said circuits upon each other.

10. Apparatus for setting up magnetic fields to define a landing path for aircraft, comprising a plurality of separate loop circuits disposed seriatim adjacent each other, said circuits being shaped in outline to define an isosceles triangle symmetrically disposed about the projection on the earth of said path, means to supply to said circuits alternating currents of decreasing magnitude in the successive circuits in a direction away from said base whereby the locus of points of constant predetermined magnetic field strength due to the currents in the sides of said triangle define a suitable said landing path, and means to neutralize the mutual inductive effect of said circuits upon each other.

11. Apparatus for setting up magnetic fields to define a landing path for aircraft, comprising a plurality of separate loop circuits disposed seriatim adjacent each other, said circuits being shaped in outline to define an isosceles triangle on a rectangular base symmetrically disposed about the projection on the earth of said path, and means to supply to said circuits alternating currents of decreasing magnitude in the successive circuits in a direction away from said base whereby the locus of points of constant predetermined magnetic field strength due to the currents in the sides of said triangle defines a suitable said landing path.

EDWARD N. DINGLEY, Jr.